(12) United States Patent
Reaney

(10) Patent No.: US 8,048,505 B1
(45) Date of Patent: Nov. 1, 2011

(54) PORTABLE THERMAL LINING SYSTEMS

(76) Inventor: George W. Reaney, Phoenix, AZ (US)

( * ) Notice: Subject to any disclaimer, the term of this patent is extended or adjusted under 35 U.S.C. 154(b) by 563 days.

(21) Appl. No.: 12/277,185

(22) Filed: Nov. 24, 2008

Related U.S. Application Data

(60) Provisional application No. 61/012,266, filed on Dec. 7, 2007, provisional application No. 61/042,545, filed on Apr. 4, 2008.

(51) Int. Cl.
*B32B 3/06* (2006.01)
(52) U.S. Cl. .......... 428/60; 52/782.1; 181/290; 428/44; 428/53; 428/61; 428/188; 428/189

(58) Field of Classification Search .................. 428/44, 428/53, 60, 61, 188, 189; 181/290; 52/782.1
See application file for complete search history.

(56) References Cited

FOREIGN PATENT DOCUMENTS

| | | | |
|---|---|---|---|
| EP | 0663482 | A3 | 7/1995 |
| EP | 0761896 | B1 | 3/1997 |
| EP | 1132356 | A1 | 9/2001 |
| GB | 2087448 | A | 5/1982 |
| GB | 2107756 | A | 5/1983 |

*Primary Examiner* — Brent O'Hern
(74) *Attorney, Agent, or Firm* — Stoneman Law Patent Group; Martin L. Stoneman

(57) ABSTRACT

This invention relates to providing a system for improved portable thermal lining systems. More particularly, this invention relates to providing systems for improved fire training facilities utilizing thermal protective elements of the above-noted portable thermal lining system.

16 Claims, 6 Drawing Sheets

PORTABLE THERMAL LINING SYSTEMS

CROSS-REFERENCE TO RELATED APPLICATION

The present application is related to and claims priority from prior provisional application Ser. No. 61/012,266, filed Dec. 7, 2007, entitled "PORTABLE THERMAL LINING SYSTEMS", and is related to and claims priority from prior provisional application Ser. No. 61/042,545, filed Apr. 4, 2008, also entitled "PORTABLE THERMAL LINING SYSTEMS", the contents of both of which are incorporated herein by this reference and are not admitted to be prior art with respect to the present invention by the mention in this cross-reference section.

BACKGROUND

This invention relates to providing a system for improved portable thermal lining systems. More particularly, this invention relates to providing systems for improved fire training procedures utilizing thermal protective elements of the above-noted portable thermal lining systems.

Most active-duty firefighters spend hundreds of hours in training. Such training typically includes live-fire training wherein firefighters manage an actual fire, typically staged within specialized live-fire facilities. An appropriately designed facility is important to successful training, however, such specialized facilities (live-fire towers, burn rooms, etc.) are expensive to build and maintain. The cost of such facilities is often beyond the limited resources of smaller fire departments/emergency organizations, volunteer fire departments, etc.

In an attempt to stage necessary live fire training, smaller firefighting entities often seek out abandon buildings that are scheduled for demolition and can be sacrificed for live-fire training exercises. Obviously, there are limited numbers of sacrificial buildings available at any one time (within any given jurisdiction). Further, such buildings are often inferior for training purposes due to inherent safety risks (related to live fire practice within a structure of unknown condition) of burning within a building.

When a building is unavailable for live-fire training, smaller firefighting entities must borrow or contract time within live-fire training facilities usually operated by larger firefighting organizations (with a larger tax base and better funded). Contracting such facilities causes a strain on smaller firefighting entities as it takes away valuable resources in cost, travel time, manpower, etc. A need exists for an inexpensive, safe, and efficient means for implementing live-fire training, particularly within smaller budgeted fire departments.

OBJECTS AND FEATURES OF THE INVENTION

A primary object and feature of the present invention is to provide a system overcoming the above-mentioned problems.

It is a further object and feature of the present invention to provide such a system to provide a cost effective live-fire training protection system.

It is a further object and feature of the present invention to provide such a system comprising high-efficiency thermal panels.

It is another object and feature of the present invention to provide such a system comprising high-efficiency thermal panels structured and arranged to disperse thermal energy within a thermal barrier comprising an overlapping plurality of such high-efficiency thermal panels.

It is a further object and feature of the present invention to provide such a system to provide a cost effective fire training protection system that can be quickly and easily delivered to a fire-training location site, assembled, utilized, disassembled and stored or transported to another location.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to improving fire-resistance of multi-paneled surfaces, comprising: at least one fire-resistant apparatus comprising a plurality of adjoining fire-resistant panels; wherein each such adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel.

Moreover, it provides such a system wherein each such adjoining fire-resistant panel further comprises: at least one front cover; at least one rear cover; and at least one fire-resistive element; wherein such at least one fire-resistive element is structured and arranged to be encapsulated within such at least one front cover and such at least one rear cover; and wherein such plurality of adjoining fire resistant panels is structured and arranged to control the passage of thermal energy from such at least one front portion to such at least one rear portion.

Additionally, it provides such a system wherein: extending substantially between such at least one front cover and such at least one rear cover, at least one peripheral edge cover structured and arranged to substantially cover at least one peripheral edge of such fire-resistant panel; and wherein such at least one peripheral edge cover is structured and arranged to assist overlap with each other such at least one peripheral edge cover of such plurality of fire-resistant panels. Also, it provides such a system wherein such at least one front cover comprises at least one fire-facing interior surface comprising at least one perforated surface. In addition, it provides such a system wherein such at least one perforated surface comprises steel. And, it provides such a system wherein such at least one rear cover comprises at least one exterior-facing surface comprising at least one solid surface.

Further, it provides such a system wherein at least one solid surface comprises steel. Even further, it provides such a system wherein such at least one rear cover comprises at least one exterior-facing surface comprising at least one solid surface. Moreover, it provides such a system wherein such at least one fire-resistive element comprises: at least one cured mixture of vermiculite; and at least one refractory-type cement. Additionally, it provides such a system wherein such at least one refractory-type cement comprises calcium aluminate. Also, it provides such a system wherein such at least one peripheral edge cover comprises at least one offset on all sides. In addition, it provides such a system wherein such at least one offset is between about one-half inch and about two-inches. And, it provides such a system wherein each such adjoining fire-resistant panel comprises at least one dimension about twenty-five inches wide, about forty inches long and about two- and one-half inches thick.

In accordance with another preferred embodiment hereof, this invention provides a system, relating to improving fire-resistance of multi-paneled surfaces, comprising: at least one fire-resistant apparatus comprising a plurality of adjoining fire-resistant panels; wherein each such adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel; wherein each such adjoining fire-resistant panel comprises at least one front cover, at least one rear cover, and at least one fire-resistive element, wherein such at least one fire-resistive element is structured and arranged to be encapsulated within such at least one front cover and such at least one rear cover; wherein such plurality of adjoining fire resistant panels is structured and arranged to control the passage of thermal energy from such at least one front portion to such at least one rear portion; and wherein such at least one thermal panel comprises at least one cured mixture of vermiculite and at least one refractory cement comprising at least one calcium aluminate chemistry.

Further, it provides such a system wherein: extending substantially between such at least one front cover and such at least one rear cover, at least one peripheral edge cover structured and arranged to substantially cover at least one peripheral edge of such fire-resistant panel; wherein such at least one peripheral edge cover is structured and arranged to assist overlap with each other such at least one peripheral edge cover of such plurality of fire-resistant panels. Even further, it provides such a system wherein such at least one front cover comprises at least one fire-facing interior surface comprising at least one perforated surface. Even further, it provides such a system wherein such at least one perforated surface comprises steel. Even further, it provides such a system wherein such at least one rear cover comprises at least one exterior-facing surface comprising at least one solid surface. Even further, it provides such a system wherein at least one solid surface comprises steel.

In accordance with another preferred embodiment hereof, this invention provides a portable thermal lining kit system comprising: a plurality of thermal lining panels structured and arranged to assemble into at least one protective barrier; and at least one support member structured and arranged to support such a plurality of thermal lining panels in at least one operable configuration; wherein each thermal lining panel of such plurality comprises at least one interlocking peripheral edge structured and arranged to form a substantially continuous thermal barrier between at least two of such thermal lining panels.

In accordance with another preferred embodiment hereof, this invention provides a system, relating to improved fire-resistance of multi-paneled surfaces, comprising: at least one fire-resistant apparatus comprising a plurality of adjoining fire-resistant panels; wherein each such adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel.

Moreover, it provides such a system wherein each such adjoining fire-resistant panel further comprises: at least one front cover; at least one rear cover; and at least one fire-resistive element situate substantially therebetween; wherein such at least one fire-resistive element is structured and arranged to be substantially encapsulated within such at least one front cover and such at least one rear cover; and wherein such plurality of adjoining fire resistant panels is structured and arranged to control the passage of thermal energy between such plurality of such at least one front covers and such plurality of such at least one rear covers. Additionally, it provides such a system further comprising: extending substantially between such at least one front cover and such at least one rear cover, at least one peripheral edge cover structured and arranged to substantially cover at least one peripheral edge of such fire-resistant panel; wherein such at least one peripheral edge cover is structured and arranged to assist overlap with each other such at least one peripheral edge cover of such plurality of fire-resistant panels.

Also, it provides such a system wherein such at least one front cover comprises at least one fire-facing interior surface comprising at least one perforated surface. In addition, it provides such a system wherein such at least one perforated surface comprises at least one thermally-conductive metal. And, it provides such a system wherein such at least one perforated surface substantially comprises steel. Further, it provides such a system wherein such at least one rear cover comprises at least one exterior-facing surface comprising at least one solid surface. Even further, it provides such a system wherein at least one solid surface comprises at least one thermally-conductive metal. Moreover, it provides such a system wherein at least one solid surface substantially comprises steel. Additionally, it provides such a system wherein: such at least one fire-facing interior surface is thermally coupled with at least one peripheral edge cover; such at least one exterior-facing surface is thermally coupled with at least one peripheral edge cover; such at least one peripheral edge cover of such adjoining fire-resistant panels, when arranged to form such overlap with each other, comprise at least one thermal link structured and arranged to thermally link such adjoining fire-resistant panels; such thermal link comprises at least one contact interaction between such adjoining fire-resistant panels; and such thermal link between such adjoining fire-resistant panels assists in distributing thermal energy between such adjoining fire-resistant panels. Also, it provides such a system wherein such at least one fire-resistive element comprises: at least one cured mixture of vermiculite; and at least one refractory-type cement.

In addition, it provides such a system wherein such at least one refractory-type cement comprises calcium aluminate. And, it provides such a system wherein such at least one peripheral edge cover comprises at least one offset extending peripherally around all sides of each such adjoining fire-resistant panel. Further, it provides such a system wherein such at least one offset is between about one-half inch and about two-inches. Even further, it provides such a system wherein such at least one contact interaction is formed by contact between at least two such at least one offsets. Even further, it provides such a system wherein each such adjoining fire-resistant panel comprises at least one dimension about twenty-five inches wide, about forty inches long and about two- and one-half inches thick.

In accordance with another preferred embodiment hereof, this invention provides a system, relating to improved fire-resistance of multi-paneled surfaces, comprising: at least one fire-resistant apparatus comprising a plurality of adjoining fire-resistant panels; wherein each such adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel; wherein each such adjoining fire-resistant panel comprises at least one front cover comprising at least one front portion, at least one rear cover comprising at least one rear portion, and at least one fire-resistive element, wherein such at least one fire-resistive element is structured and arranged to be substantially encapsulated within such at least one front cover and such at least one rear cover; wherein such plurality of adjoining fire resistant panels is structured and arranged to control the passage of thermal energy from such at least one front portion to such at least one rear portion; wherein such at least one thermal panel comprises at least one cured mixture of vermiculite and at least one refractory cement; such adjoining fire-resistant panels are structured and arranged to form at least one contact overlap with each other; wherein such at least one contact overlap comprises at least one thermal link structured and arranged to thermally link such adjoining fire-resistant panels; and wherein such thermal link between such adjoining fire-resistant panels assists in distributing thermal energy between such adjoining fire-resistant panels.

Even further, it provides such a system further comprising: extending substantially between such at least one front cover and such at least one rear cover, at least one peripheral edge cover structured and arranged to substantially cover at least one peripheral edge of such fire-resistant panel; wherein such at least one peripheral edge cover is structured and arranged to assist overlap with each other such at least one peripheral edge cover of such plurality of fire-resistant panels. Even further, it provides such a system wherein: such at least one front cover comprises at least one fire-facing interior surface comprising at least one perforated heat-conductive surface; and such at least one rear cover comprises at least one exterior-facing surface comprising at least one heat-conductive solid surface.

Furthermore, it provides such a system further comprising: at least one structural support member structured and arranged to structurally support such plurality of adjoining fire-resistant panels; wherein each such plurality of adjoining fire-resistant panels comprises at least one coupler structured and arranged to couple each such plurality of adjoining fire-resistant panels to such at least one structural support member. In accordance with a preferred embodiment hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
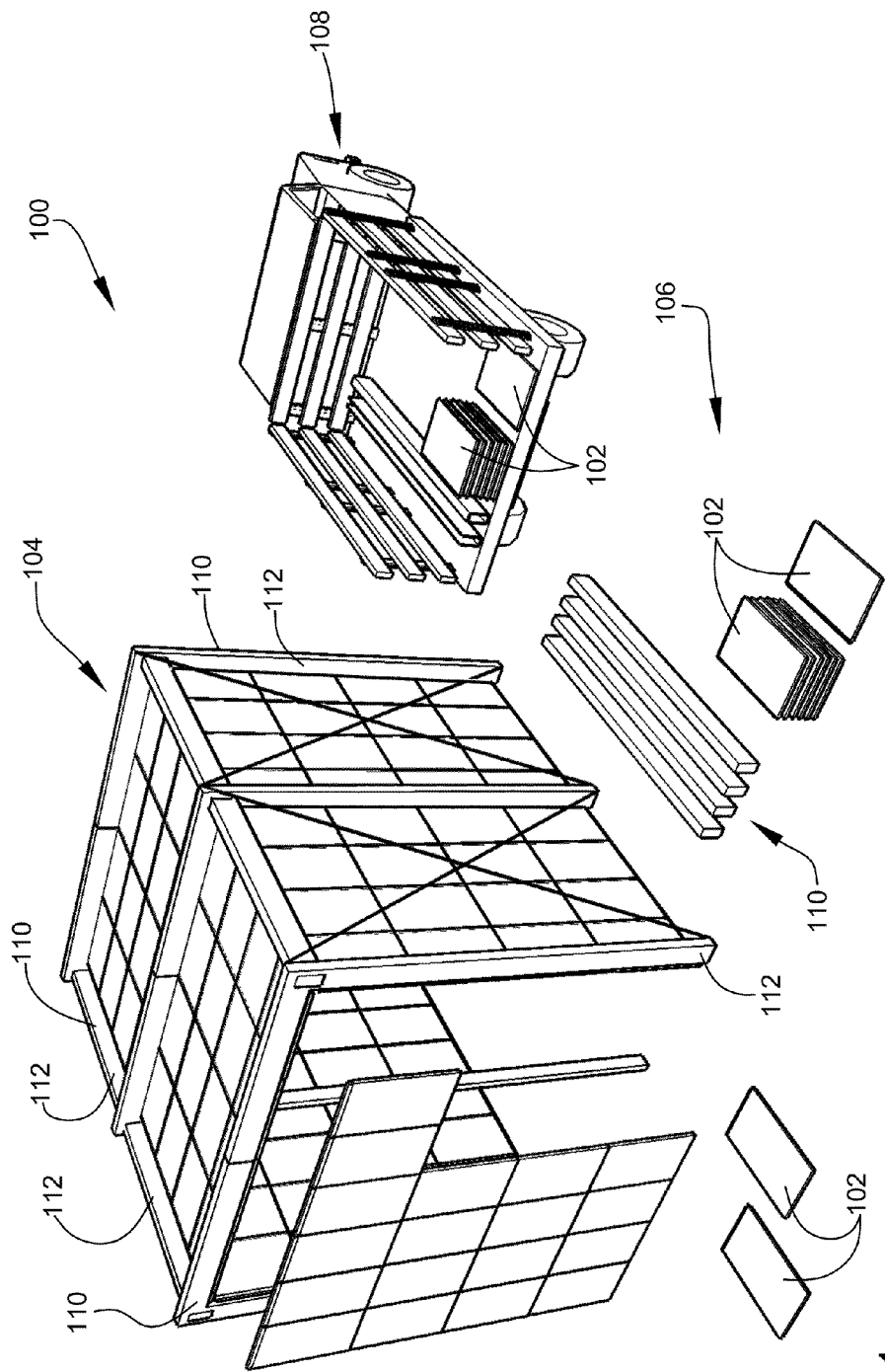
FIG. 1 shows a perspective view, illustrating a field-assembled live-fire burn room, constructed utilizing components of the portable thermal lining system, preferably including a plurality of thermal lining panels, according to a preferred embodiment of the present invention.

FIG. 1 shows a perspective view, illustrating a field-assembled live-fire burn room 104, constructed utilizing components of the portable thermal lining system 100, preferably including a plurality of thermal lining panels 102, according to a preferred embodiment of the present invention.

Preferably, burn room 104 is specifically designed to support live-fire training wherein an actual fire is generated in or around burn room 104. Thermal lining panels 102 preferably function as high-performance thermal insulators, separating heat sources from the surrounding environment. Additionally, thermal lining panels 102 preferably overlap each other and assist thermal heat dissipation by blocking escaping heat through adjoining seams and by assisting thermal heat to transfer easily between panels, as shown.

Preferably, burn room 104 is adapted to be substantially freestanding after assembly. Preferably, components 106 of portable thermal lining system 100 are adapted to be transportable within standard road-going vehicles 108, and assembled on-site without specialized equipment (using common hand tools). Thus, a firefighting organization may quickly assemble burn room 104, perform the live training, disassemble burn room 104 to its constituent components (post training), and return the components to storage for future use.

Preferably, thermal lining panels 102 are of a modular design to allow for the development of burn structures of many varying physical sizes and configurations. Preferably, each thermal lining panel 102 is designed to overlap with one or more adjacent thermal lining panels 102 to assist in the formation of continuous thermal barriers (see also FIG. 3).

The unique features and arrangements of the overlapping panels preferably develop a cohesive unit, efficiently distributing thermal loads throughout the total assembled structure.

Additional support structures 110 are provided as required by the size and configuration of the intended design. Such support structures 110 are also preferably of a modular design to facilitate flexibility of arrangement and ease of construction. Those with ordinary skill in the art will now appreciate that upon reading this specification and by their understanding the art of modular support structures as described herein, methods of making such modular support structures will be understood by those knowledgeable in such art. Preferably, such support structures 110 comprise a network of support channels 112 adapted to support the peripheral edges of thermal lining panels 102 and a plurality of cabling tensioners to provide compressive support for the thermal lining panels 102 and support channels 112. Upon reading this specification, those with ordinary skill in the art will now appreciate that, under appropriate circumstances, considering such issues as cost, user preference, etc., other support arrangements such as, for example, an arrangement of panel-mounted clips adapted to slidably interlock with a plurality of flat supportive bars, etc., may suffice.

Preferably, thermal lining panels 102 are high-temperature resistive panel units being able to withstand and disperse live-fire training "burns" (defined as fire used for the duration of a live-fire training exercise). Preferably, components of portable thermal lining system 100 are designed for use to conform with NFPA (National Fire Protection Association) coded and Underwriters Laboratories certified materials for use in such live-fire training facilities. Preferably, components also are compliant for both UL Class A and Class I fire-rated materials; and, for gas-fired simulators often used in live-fire training. Upon reading the teachings of this specification, those of ordinary skill in the art will now understand that, under appropriate circumstances, considering such issues as intended use, cost, codes, etc., other component arrangements, such as temperature sensing and indicating systems, protection rails, door sub-systems, window sub-systems, floor sub-systems, fasteners, assembly lifts, storage and transport boxes, waterproofing, fired generation devices, ventilators, smoke control devices, communication apparatus, life safety components, etc., may suffice.

Figure 2:
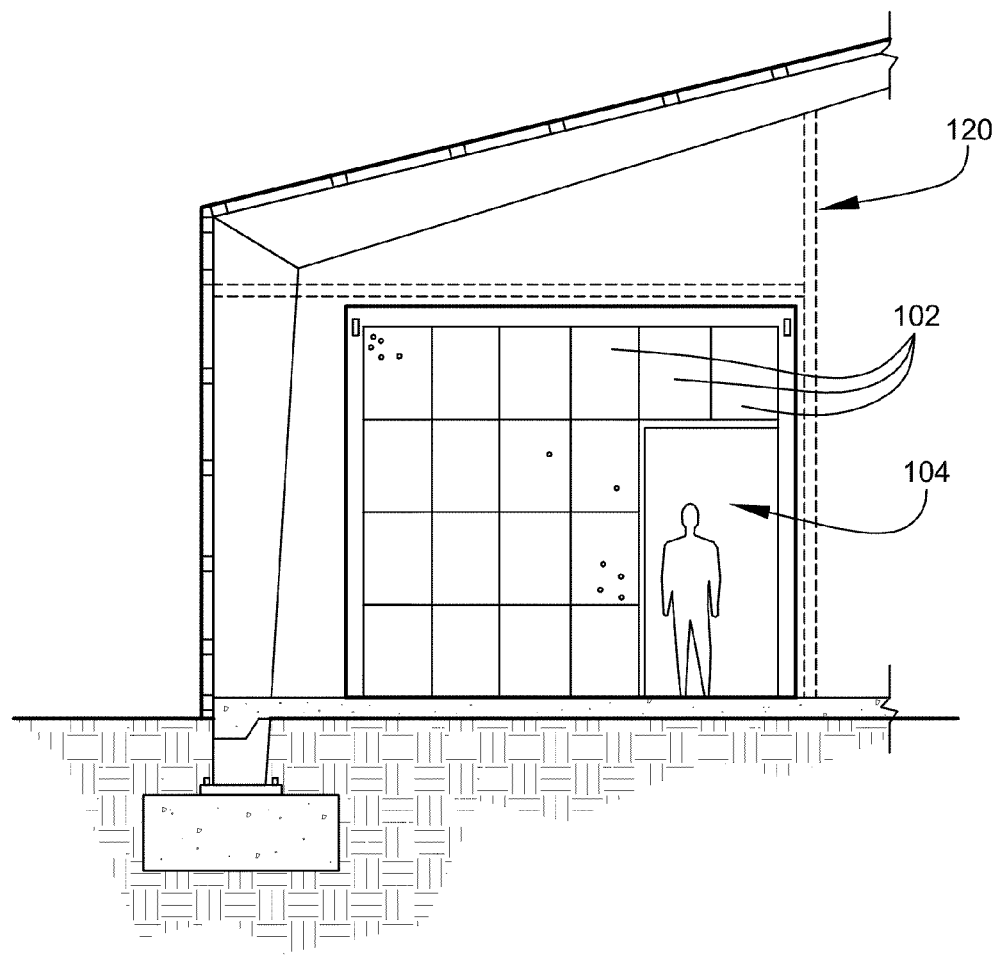
FIG. 2 shows a perspective elevation view, partially in section, illustrating a burn room constructed utilizing the modular thermal lining panels of FIG. 1, preferably built within an existing building structure, according to another preferred embodiment of the present invention.

FIG. 2 shows a perspective elevation view, partially in section, illustrating burn room 104 constructed utilizing modular thermal lining panels 102 of FIG. 1, preferably built within existing building structure 120, according to another preferred embodiment of the present invention.

Preferably, burn room 104 is adapted to protect steel, wood, concrete and masonry structures in an existing building structure 120 from repeated live-fire training "burns".

A major cause of structural failure within training buildings is the lack of control of steam-laden air (most especially within concrete structures). The preferred construction of thermal lining panels 102 provides excellent insulation for the surrounding existing building structures 120, as shown.

In the preferred embodiment of FIG. 2, thermal lining panels 102 are provided for protection of the interior existing building components (e.g., interior walls, ceiling, doors, windows, etc.) of existing building structure 120, as shown. Preferably, thermal lining panels 102 are supported by a system of support channels 112 preferably mounted both horizontally and vertically, and preferably fastened to the existing building structure 120 using appropriate mechanical fasteners. Those with ordinary skill in the art will now appreciate that upon reading this specification and by their understanding the art of attachment as described herein, methods of attaching the support channels 112 to the existing building structure 120 will be understood by those knowledgeable in such art.

A distinct advantage of portable thermal lining system 100 is that the system is essentially pre-engineered and may be provided as a Kit with all of the items necessary to build a pre-engineered, pre-certified burn room 104. This preferred feature resolves many existing issues related to lack of standard codes and requirements within the field of live-fire training facilities. Preferably, portable thermal lining system 100 provides an arrangement and system that greatly assists in the development of safe and effective training facilities. Furthermore, preferably, portable thermal lining system 100 may be specified in a manner similar to other building components. Thus, a fire fighting organization may save considerable cost by contracting with non-specialized members of the construction industry during the construction of such a live-fire training building using portable thermal lining system 100.

Preferably, portable thermal lining system 100 is also useful in the construction of additional burn areas within existing training facilities. Furthermore, portable thermal lining system 100 may be retrofitted within concrete training buildings that have been damaged over time.

Figure 3:
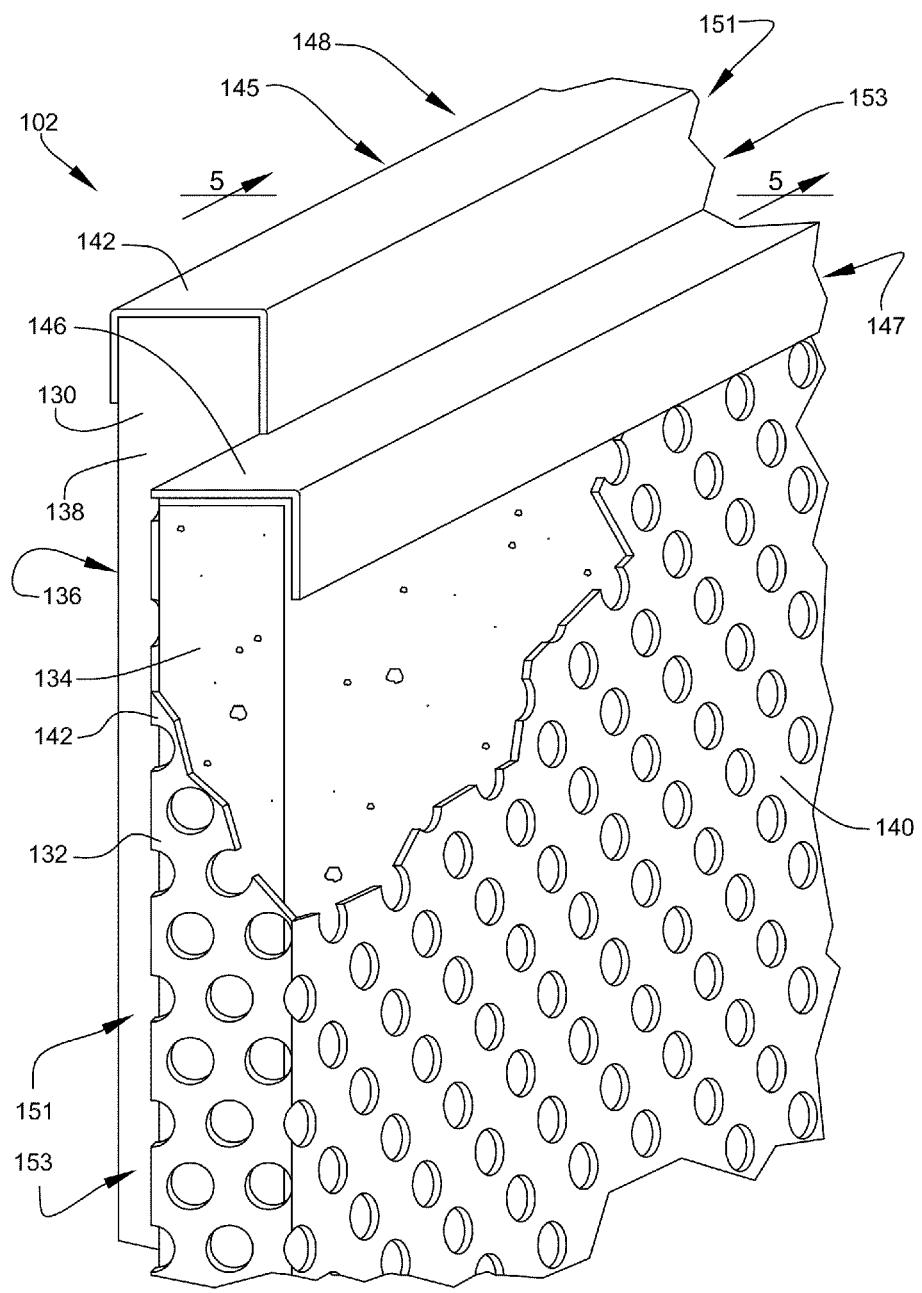
FIG. 3 shows a perspective view of a thermal lining panel, according to the preferred embodiment of FIG. 1.
Figure 4:
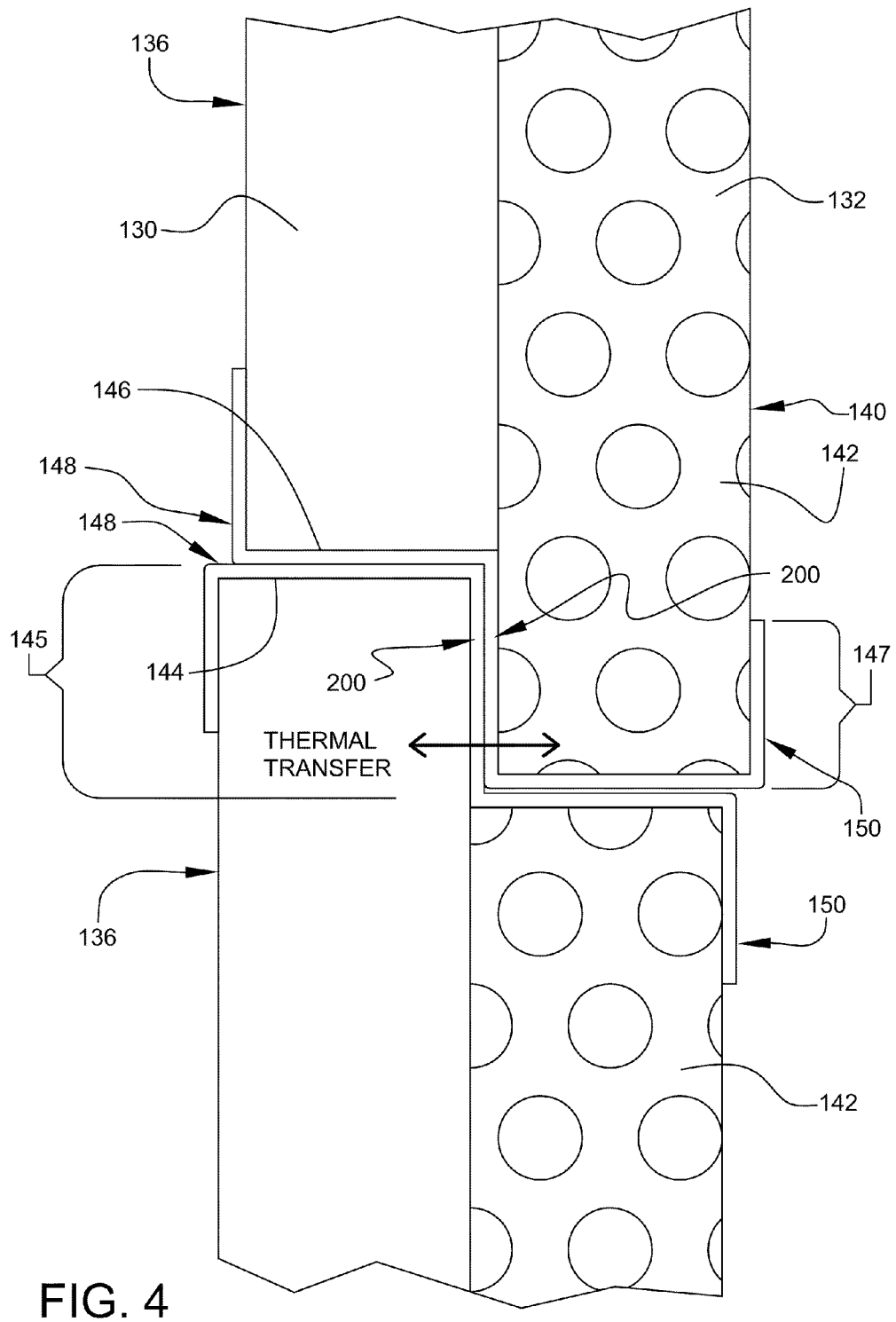
FIG. 4 shows a top view of two adjoining thermal lining panels, according to the preferred embodiment of FIG. 1.
Figure 5:
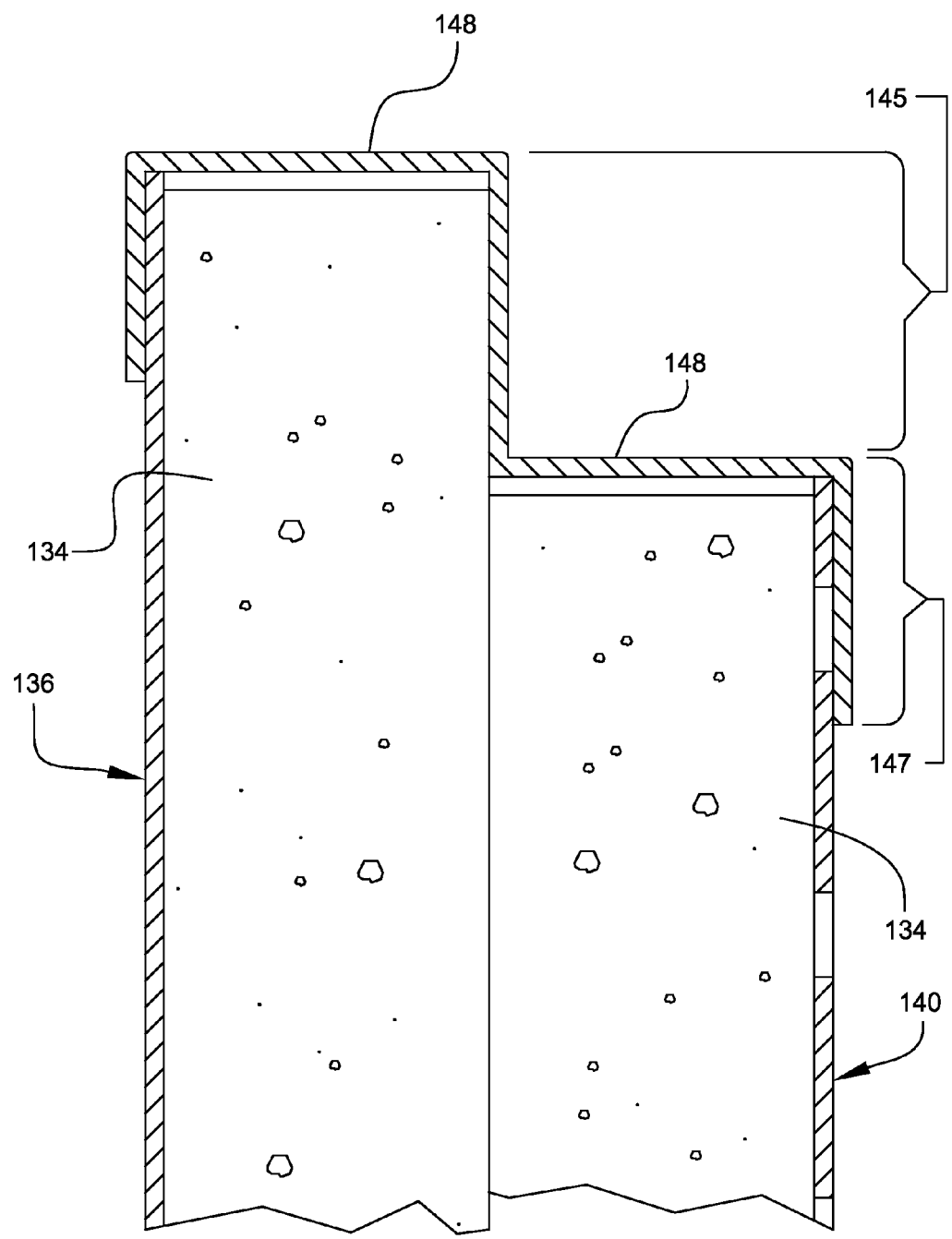
FIG. 5 shows a section view, through section 5-5 of FIG. 3.

FIG. 3 shows a perspective view of a thermal lining panel 102, according to the preferred embodiment of FIG. 1. FIG. 4 shows a side view of two adjoining thermal lining panels 102, according to the preferred embodiment of FIG. 1. FIG. 5 shows a section view, through section 5-5 of FIG. 3.

Thermal lining panels 102 preferably comprise a generally rectilinear and substantially planar geometry, as shown. Preferably, thermal lining panels 102 are substantially water resistant/repellent and preferably allow for live-fire in temperature ranges of about 1200-degrees Fahrenheit to about 2000-degrees Fahrenheit—maximum. Seams and joints between panels are preferably overlapped to form a continuous thermal barrier and reduce escaping heat from seams by providing non-linear seam arrangements. As long as at least one pair of faces of adjacent overlapping panels are in contact, adjacent thermal lining panels 102 may be installed with small panel-to-panel gaps, as required to accommodate thermal expansion within the assembly.

Preferably, thermal lining panel 102 comprises at least one solid tray portion 130 and at least one perforated portion 132, as shown. Preferably, perforated portion 132 (at least embodying herein at least one front cover) is oriented to face towards the fire/heat (front) and solid tray portion 130 (at least embodying herein at least one rear cover) is oriented to face away from the fire/heat (rear). Preferably, solid tray portion 130 comprises about one-half of thermal lining panel 102 and perforated portion 132 comprises the other about one-half of thermal lining panel 102, as shown. Each thermal lining panel 102 preferably comprises four adjoining peripheral side portions 151, as shown, with each peripheral side portion 151 preferably comprising an interlocking offset 153, as shown. Both perforated portion 132 and solid tray portion 130 are thermally coupled with side portion 151 (at least embodying herein at least one peripheral edge cover and at least one offset extending peripherally around all sides of each said adjoining fire-resistant panel).

Side portion 151 of solid tray portion 130 preferably comprises a solid metal panel cover on one face 136 and all end portions 138 circumferential about face 136, as shown. Preferably, solid tray portion 130 is adjoined by perforated portion 132 comprising a perforated metal panel cover on the opposing face 140 and perforated metal on all end portions 142 circumferential about face 140, as shown. Preferably, situate peripherally on the top edge 144 and bottom edge 146 of thermal lining panel 102 is cap 148, preferably forming the remaining side portions 151 as shown. Preferably, cap 148 comprises a solid (non-perforated) metal cap, which preferably covers the top, edges and about one to two inches of the respective face 136/140 of thermal lining panel 102, as shown. Preferably, metal cap 148 comprises the combination of essentially a U-shaped portion 145 joined with an essentially L-shaped portion 147 together forming offset 153, as shown. Preferably, metal cap 148 assists structural support of the thermal lining panel 102 weight when such thermal lining panels 102 are stacked vertically. Upon reading this specification, those with ordinary skill in the art will now appreciate that, under appropriate circumstances, considering such issues as manufacturing preference, cost, structural requirements, available materials, technological advances, etc., other cap arrangements such as, smaller or larger cap, no cap, thicker cap, perforated cap, etc., may suffice. Further, upon reading this specification, those with ordinary skill in the art will now appreciate that, under appropriate circumstances, considering such issues as manufacturing preference, cost, structural requirements, available materials, technological advances, etc., other cap geometries such as, those that would cover other panel geometries may suffice.

Preferably, solid tray portion 130 and perforated portion 132 comprise at least one thermally-conductive metal, preferably steel, preferably stainless steel, preferably about one-eight inch thick steel, preferably welded together, preferably by spot welding, preferably at about every two inches around the perimeter of at least two sides. Only two sides are preferred to be welded to allow for expansion and contraction of the thermal lining panel 102 that occurs due to the intense heat and cooling that occurs during live-fire training. Preferably, cap 148 comprises at least one thermally-conductive metal, preferably steel, preferably stainless steel, and preferably about one-eight inch thick steel. Preferably, cap 148 is riveted into the top edge 144 and bottom edge 146 of thermal lining panel 102. Upon reading this specification, those with ordinary skill in the art will now appreciate that, under appropriate circumstances, considering such issues as manufacturing preference, cost, structural requirements, available materials, technological advances, etc., other means for connecting a solid tray portion and a perforated portion such as, mechanical fastening, solid welding, etc., may suffice. Further, upon reading this specification, those with ordinary skill in the art will now appreciate that, under appropriate circumstances, considering such issues as manufacturing preference, cost, structural requirements, available materials, technological advances, etc., other means for connecting a cap to a thermal lining panel, such as, other mechanical fastening, solid welding, etc., may suffice.

Preferably, both solid tray portion 130 and perforated portion 132 comprise at least one thermal infill material 134, as shown. Excepting the portions of the infill material exposed through the perforations, thermal infill material 134 is fully encapsulated by solid tray portion 130, perforated portion 132, and cap 148, as shown. Preferably, thermal infill material 134 comprises a cement-like calcium silicate composition; such cement-like calcium silicate composition is preferably used in the construction/protection of thermal lining panels 102 used for vertical walls. Preferably, thermal infill material 134 used for the construction/protection of ceilings comprises a cured mixture of vermiculite and at least one specialty refractory cement, known as cement fondue. Cement fondue is a hydraulic binder based on high aluminates cement comprising calcium aluminates, rather than calcium silicates (which are the basis of Portland cement). High aluminates content further assists in reducing shrinkage when exposed to high heat. Ceilings are typically exposed to the highest heat during a fire and, as such, may require a slightly different thermal infill material 134. Those with ordinary skill in the art will now appreciate that upon reading this specification and by their understanding the art of thermal infill materials as described herein, methods of making such thermal infill materials will be understood by those knowledgeable in such art. Further, upon reading this specification, those with ordinary skill in the art will now appreciate that, under appropriate circumstances, considering such issues as manufacturing preference, cost, structural requirements, available materials, technological advances, etc., other thermal panel arrangements, such as, using all panels with high aluminates content, etc., may suffice.

Preferably, each respective thermal lining panel 102 is about twenty-five and one-quarter inches wide, about forty and one-half inches long and about two- and one-half inches thick. Upon reading this specification, those with ordinary skill in the art will now appreciate that, under appropriate circumstances, considering such issues as manufacturing preference, material thickness, cost, structural requirements, available materials, technological advances, thermal infill material used etc., other dimensions such as, greater than stated, smaller than stated, etc., may suffice.

Figure 6:
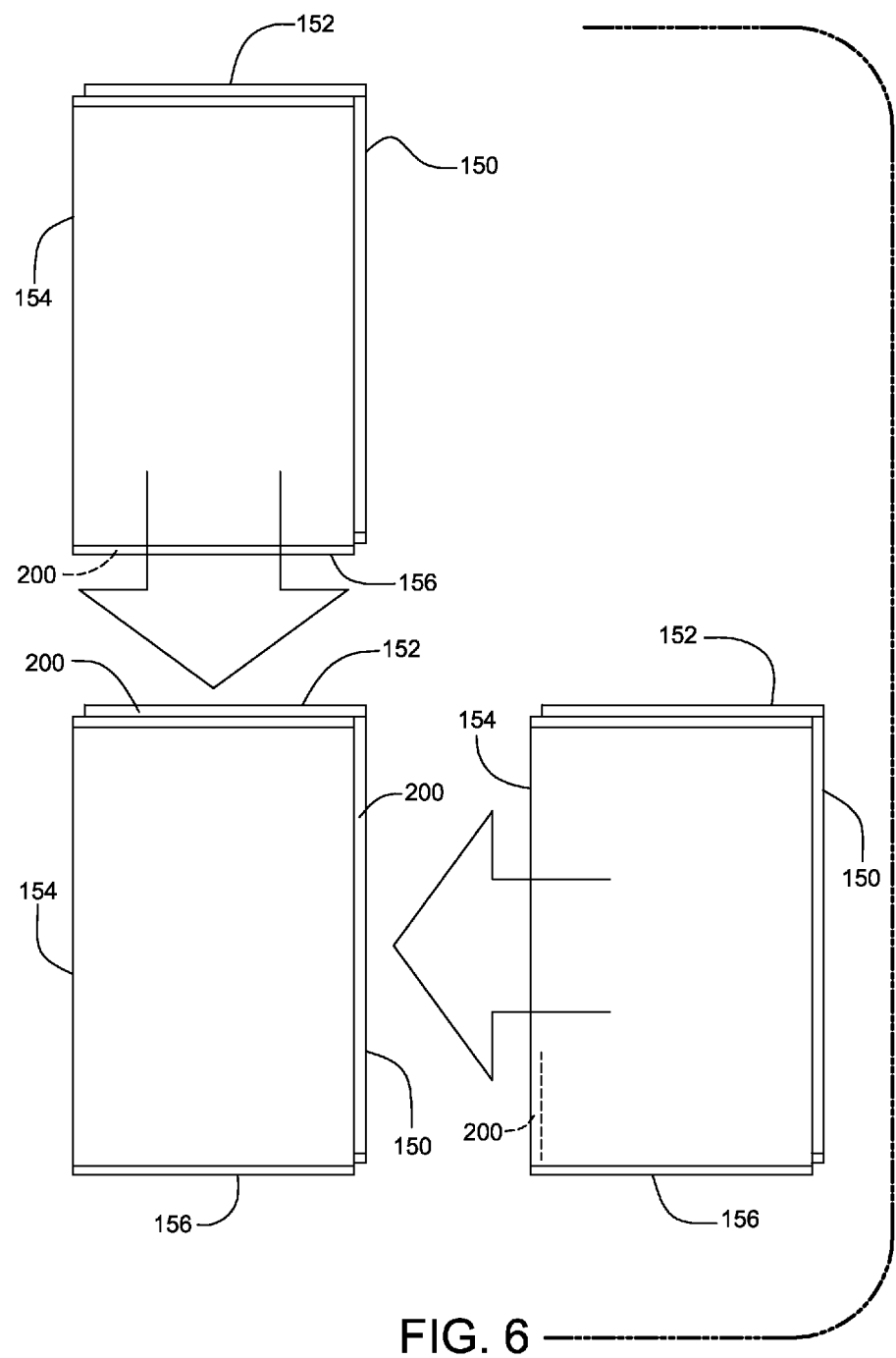
FIG. 6 shows an illustrative view of adjoining of thermal lining panels in both horizontal and vertical arrangement.

FIG. 6 shows an illustrative view of adjoining of thermal lining panels 102 in both horizontal and vertical arrangement.

Preferably, the total thickness of thermal lining panel 102 is about two- and one-half inches in thickness, preferably comprising two half-portions one-half within solid tray portion 130 and one-half within perforated portion 132, as shown. Preferably, each half-portion is offset about three-quarters of an inch so that there is about a three-quarter inch offset of the solid tray portion 130 along one longitudinal side 150 and one transverse side 152; and about a three-quarter inch offset of the perforated portion 132 along the opposing longitudinal side 154 and transverse side 156, as shown. This preferred peripheral edge arrangement provides for offsetting overlapping of the thermal lining panels 102 when adjoined, as shown (at least embodying herein wherein said at least one peripheral edge cover is structured and arranged to assist overlap with each other said at least one peripheral edge cover of said plurality of fire-resistant panels). Upon reading this specification, those with ordinary skill in the art will now appreciate that, under appropriate circumstances, considering such issues as manufacturing preference, cost, structural requirements, available materials, technological advances, etc., other overlapping arrangements may suffice. Further, upon reading this specification, those with ordinary skill in the art will now appreciate that, under appropriate circumstances, considering such issues as manufacturing preference, cost, structural requirements, available materials, technological advances, etc., other geometrical panel arrangements such as, hexagonal, square, octagonal, parallelogram, trapezoid, etc., may suffice.

Preferably, as shown in FIG. 6, a plurality of thermal lining panels 102 may be interconnected with overlapping opposing ends. As such, wall sections (and ceiling sections) may be formed into a field-assembled live-fire burn room 104, constructed utilizing components of the portable thermal lining system 100, preferably including a plurality of thermal lining panels 102, as shown. Furthermore, as best shown in both FIG. 4 and FIG. 6, the preferred arrangements of offset 153 preferably distribute thermal energy between adjoining thermal lining panels 102 by forming at least one metal-to-metal contact interaction between adjoining panels, as shown. This preferred contact interaction preferably occurs primarily at contact faces 200 of adjacent panels, as shown. The thermal conductivity of the metallic structures forming the overlapping contact faces 200 are preferably used to form thermal links 202 between the panels. These thermal links 202 are preferably structured and arranged to thermally link adjoining thermal lining panels 102 to generate a substantially unitary thermally-conductive structure. Such "thermal linking" between adjoining thermal lining panels 102 assists in distributing thermal energy between adjoining thermal lining panels 102 so that no one panel must absorb the full thermal load imparted by the fire (at least embodying herein wherein said plurality of adjoining fire resistant panels is structured and arranged to control the passage of thermal energy between such plurality of said at least one front covers and such plurality of said at least one rear covers).

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to improved fire-resistance of multi-paneled surfaces, comprising:
   a) at least one disassemblable fire-resistant apparatus comprising a plurality of adjoining fire-resistant panels;
   b) wherein each said adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel; and
   c) wherein each said adjoining fire-resistant panel further comprises
      i) at least one front cover;
      ii) at least one rear cover; and
      iii) at least one fire-resistive element situate substantially therebetween;
      iv) wherein said at least one fire-resistive element is structured and arranged to be substantially encapsulated within said at least one front cover and said at least one rear cover; and
      v) wherein said plurality of adjoining fire resistant panels is structured and arranged to control the passage of thermal energy between such plurality of said at least one front covers and such plurality of said at least one rear covers; and
      vi) extending substantially between said at least one front cover and said at least one rear cover, at least one peripheral edge cover structured and arranged to substantially cover at least one peripheral edge of said fire-resistant panel;
      vii) wherein said at least one peripheral edge cover is structured and arranged to assist overlap with each other said at least one peripheral edge cover of said plurality of fire-resistant panels;
      viii) wherein said at least one front cover comprises at least one fire-facing interior surface comprising at least one perforated surface; and
      ix) wherein said at least one perforated surface comprises at least one thermally-conductive metal.

2. The system according to claim 1 wherein said at least one perforated surface substantially comprises steel.

3. The system according to claim 1 wherein said at least one rear cover comprises at least one exterior-facing surface comprising at least one solid surface.

4. The system according to claim 3 wherein at least one solid surface comprises at least one thermally-conductive metal.

5. The system according to claim 3 wherein at least one solid surface substantially comprises steel.

6. The system according to claim 4 wherein:
   a) said at least one fire-facing interior surface is thermally coupled with at least one peripheral edge cover;
   b) said at least one exterior-facing surface is thermally coupled with at least one peripheral edge cover;
   c) said at least one peripheral edge cover of said adjoining fire-resistant panels, when arranged to form such overlap with each other, comprise at least one thermal link structured and arranged to thermally link said adjoining fire-resistant panels;
   d) said thermal link comprises at least one contact interaction between said adjoining fire-resistant panels; and
   e) said thermal link between said adjoining fire-resistant panels assists in distributing thermal energy between said adjoining fire-resistant panels.

7. The system according to claim 1 wherein said at least one fire-resistive element comprises:
   a) at least one cured mixture of vermiculite; and
   b) at least one refractory-type cement.

8. The system according to claim 7 wherein said at least one refractory-type cement comprises calcium aluminate.

9. The system according to claim 6 wherein said at least one peripheral edge cover comprises at least one offset extending peripherally around all sides of each said adjoining fire-resistant panel.

10. The system according to claim 9 wherein said at least one offset is between about one-half inch and about two-inches.

11. The system according to claim 9 wherein said at least one contact interaction is formed by contact between at least two said at least one offsets.

12. The system according to claim 1 wherein each said adjoining fire-resistant panel comprises at least one dimension about twenty-five inches wide, about forty inches long and about two- and one-half inches thick.

13. A system, relating to improved fire-resistance of multi-paneled surfaces, comprising:
   a) at least one disassemblable fire-resistant apparatus comprising a plurality of adjoining fire-resistant panels;
   b) wherein each said adjoining fire-resistant panel is structured and arranged so that, when adjoined, each first adjoining fire-resistant panel, when adjoined with each second adjoining fire-resistant panel, partially overlaps such second adjoining fire-resistant panel at each area of adjacent perimeters of such first adjoining fire-resistant panel and such second adjoining fire-resistant panel;
   c) wherein each said adjoining fire-resistant panel comprises
      i) at least one perforated front cover comprising at least one front portion,
      ii) at least one rear cover comprising at least one rear portion, and
      iii) at least one fire-resistive element,
   d) wherein said at least one fire-resistive element is structured and arranged to be substantially encapsulated within said at least one perforated front cover and said at least one rear cover;
   e) wherein said plurality of adjoining fire resistant panels is structured and arranged to control the passage of thermal energy from said at least one front portion to said at least one rear portion;
   f) wherein said at least one thermal panel comprises at least one cured mixture of vermiculite and at least one refractory cement;
   g) wherein said adjoining fire-resistant panels are structured and arranged to form at least one contact overlap with each other;
   h) wherein said at least one contact overlap comprises at least one thermal link structured and arranged to thermally link said adjoining fire-resistant panels; and
   i) wherein said thermal link between said adjoining fire-resistant panels assists in distributing thermal energy between said adjoining fire-resistant panels.

14. The system according to claim 13 further comprising:
   a) extending substantially between said at least one perforated front cover and said at least one rear cover, at least one peripheral edge cover structured and arranged to substantially cover at least one peripheral edge of said fire-resistant panel;

b) wherein said at least one peripheral edge cover is structured and arranged to assist overlap with each other said at least one peripheral edge cover of said plurality of fire-resistant panels.

15. The system according to claim 14 wherein:

a) said at least one perforated front cover comprises at least one fire-facing interior surface comprising at least one perforated heat-conductive surface; and b) said at least one rear cover comprises at least one exterior-facing surface comprising at least one heat-conductive solid surface.

16. The system according to claim 15 further comprising at least one structural support member structured and arranged to structurally support said plurality of adjoining fire-resistant panels.

* * * * *